Jan. 31, 1967 B. J. WARMAN ETAL 3,302,068

ELECTRICAL CIRCUIT MODULES

Filed April 13, 1964 5 Sheets-Sheet 1

Jan. 31, 1967 B. J. WARMAN ETAL 3,302,068

ELECTRICAL CIRCUIT MODULES

Filed April 13, 1964 5 Sheets-Sheet 3

United States Patent Office 3,302,068
Patented Jan. 31, 1967

3,302,068
ELECTRICAL CIRCUIT MODULES

Bloomfield James Warman, Charlton, London, Raymond John Frederick Derbyshire, Welling, Kent, and Derek Peter Garrett, Southwark, London, England, assignors to Associated Electrical Industries Limited, London, England, a British company Filed Apr. 13, 1964, Ser. No. 359,345
Claims priority, application Great Britain, Apr. 23, 1963, 15,992/63
11 Claims. (Cl. 317—101)

This invention relates to electrical circuit modules by which is meant unitary assemblies of electric circuit elements (which term includes electrical conductors as well as other circuit elements) which can be used in building up an overall circuit organization of modular construction.

The invention has an important application to reed relays for use in co-ordinate switching arrangements, for example in telecommunication switching systems. As will be seen however it is generally applicable to modular circuit arrangements in which connection is required between circuit elements of adjacent modules.

According to the invention there is provided an electric circuit module having an end face, formed by an end piece. The words "end piece" are used herein in the generic sense to include end cheeks, end plates or the like, through which terminal members project from the circuit elements of the module and across which conductors extend from positions of connection with said terminal members to positions adjacent opposite edges of the end face, at which latter positions the conductors have tag portions extending outwardly of the end face in a direction transverse thereto. If two such modules are assembled together side-by-side so that their said conductors are in general alignment with the tag portions of these conductors lying alongside each other, either touching or minimally spaced, these tag portions can be connected together as by dip soldering so that the conductors thereby connected become an effective multiple extending across the end of the modular assembly. Moreover if a greater number of modules having such terminal members and conductors at both ends are arranged side-by-side matrix-wise in rows and columns, multiples can be formed as just indicated across the front and the rear of the matrix. If then the conductors at one end of each module extend orthogonally with respect to those at the other end, the multiples so formed at the front and rear of the matrix will also be orthogonally disposed.

In carrying out the invention an end plate or cheek of a module may accommodate the requisite number of conductors in the form of elongated members such as wires or strips extending from adjacent one edge to adjacent the opposite edge and bent at or adjacent these edges into planes transverse to the end face each wire or strip being formed so as also to project alongside the projecting terminal member with which it has to be connected, permitting this latter connection to be established or fortified, again as by dip soldering. Alternatively for each terminal member the end plate or cheek may accommodate two wires or strips projecting alongside the terminal member and extending to opposite edges of the end plate or cheek where they are bent substantially at right angles to the end plate or cheek. Conveniently each end plate or cheek may be of a composite form comprising two parts sandwiching the wires or strips between them with the wires or strips protruding out through the holes accommodating the terminal portions in the outer of these two parts. Then two parts may be individual plates or the inner of the two parts may be formed by an end wall of a module housing to which the outer part is secured. When the wires or strips are of a form extending from one edge to the other of an end plate accommodating them, there is an alternative possibility of threading the wires or strips through holes extending between opposite edges of the end plate within the thickness thereof and forcing intermediate portions of the threaded wires or strips out through the holes which accommodate the terminal members of the contact elements.

In order that the nature of the invention may be more readily understood certain embodiments thereof will now be described with reference to the accompanying drawings in which.

Figure 1:
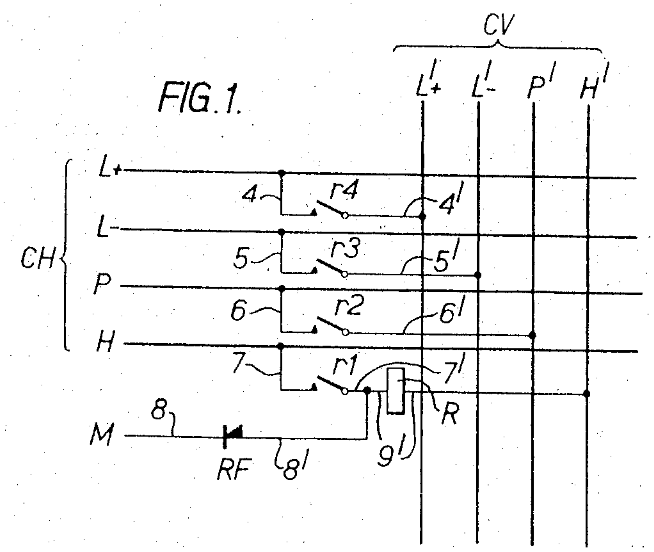
FIG. 1 illustrates the connections required at a typical cross-point of a co-ordinate switching arrangement in which reed relay modules according to the invention can be employed.

Referring to FIG. 1 there is illustrated in respect of a co-ordinate switching matrix comprising two co-ordinate sets of connections, a typical cross-point defined by a multi-conductor connection CH of one set and a multi-conductor CV of the other set, these connections comprising conductors L+, L−, P, H and L'+, L'−, P', H' respectively. Interconnection of the two connections CV and CH can be effected by selective operation of cross-point relay R having contacts *r1*–*r4*. With a positive marking potential already present on conductor H' to mark connection CV (the potential having been applied for instance in another switching section to which the set of connections including CV extend) the application of a negative marking potential to a marking lead M associated with the connection CH will cause operation of relay R through rectifier RF, thereby interconnecting the conductors of the marked connections CV and CH through contacts *r1*–*r4*. The interconnection of conductors H' and H includes the operating coil of relay R in series with its contact *r1*, so that when the marking potential on conductor M is later removed the relay R can be held operated between the potential on conductor H' and a holding potential applied to conductor H, being for instance a marking potential similarly applied at a cross-point in another switching stage to which the connection CH extends, this latter marking potential selectively operating the relay at the last mentioned cross-point in conjunction with the potential extended to its from conductor H' via the operating coil of relay R, its contact *r1*, and conductor H.

It will be appreciated that one one side the contacts *r1*–*r4* are multipled by connections L+, L−, P and H with the corresponding contacts of the relays at the other cross-points defined with ordinate connection CH, that on the other side the contacts *r2*–*r4* are multipled by connections L+, L− and P with the corresponding contacts of the relays at the other cross-points formed with ordinate connections CV, while contact r1 is connected to one terminal of rectifier RF and of the operating coil of relay R, and that the other terminal of the operating coil is multipled by conductor H′ with the operating coils of the relays at the other cross-points formed with CV. The remaining terminal of rectifier RF may also have to be multipled to corresponding rectifiers in marking connections likewise associated with ordinate connections corresponding to CH in other co-ordinate switching matrices.

It will be assumed that the contacts r1–r4 are provided by respective reed contact units located side-by-side in a "square" arrangement within a single operating coil, with terminal portions of the contact elements projecting at opposite ends of the coil. It will further be assumed that rectifier RF is also located within the coil, centrally with respect to the contact units, with terminal wires projecting at opposite ends of the coil similarly to the terminal portions of the contact elements.

Figures 2, 3:
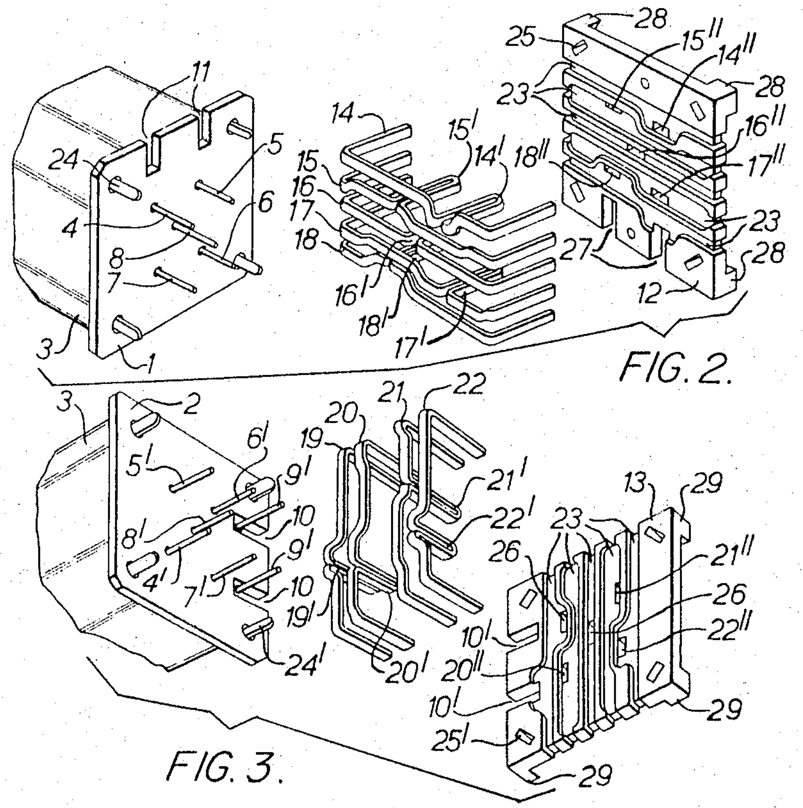
FIG. 2 is an exploded view showing the construction at one end of a reed relay module embodying the invention and adapted for use at a cross-point such as that typified in FIG. 1.
FIG. 3 is an exploded view showing the construction at the other end of the same reed relay module.

Referring to FIGS. 2 and 3 the operating coil, contact units and rectifier (none of them visible) are located between end plates 1 and 2 separated by a screening member 3 which embraces the coil but, in order not to constitute a short-circuited turn about it, does not completely surround it. The end plates 1 and 2 extend beyond the periphery of the screen 3 on all sides so that the whole relay module is contained within a rectangular volume bounded by the planes containing the edges of the end plates. The terminal members of the contact units, which are located within the operating coil, project through the end plate 1 at one end as indicated at 4–7 and through the end plate 2 at the other end as indicated at 4′–7′. Also terminal members from the rectifier project through the plates 1 and 2 at the opposite ends as indicated at 8 and 8′ respectively, while at one end terminal members 9′ from the operating coil extend out through the end plate 2 through slots 10. The end plate 1 is shown as having slots 11 corresponding to the slots 10 in plate 2 so that the end plates 1 and 2 are identical, thereby facilitating manufacture. The reference numerals 4–8 and 4′–9′ have been inserted in FIG. 1 in order to make it easier to relate this figure to FIGS. 2 and 3.

Over the projecting terminal members 4–8 at one end and 4′–9′ at the other end fit outer end plates 12 and 13 between which and the inner end plates 1 and 2 respectively are sandwiched preformed conductor strips 14–18 and 19–22. At each end these conductor strips extend generally parallel to each other, with those at one end disposed orthogonally with respect to those at the other end. The strips are preformed however so that each crosses a certain one of the openings by which the terminal members 4–8 or 4′–9′, as the case may be, pass through the end plates. At the position of the relevant hole each strip is formed with a loop (indicated by the same reference numeral as the strip, primed) which will project out through the hole in the outer end plate (12 or 13) with the two sides of the loop lying along opposite sides of the terminal member which also projects through this hole. Each strip is also bent at right angles at its ends so as to extend across the edges of the outer end plate and project outwardly beyond this outer surface. The preformed strips can first be fitted on the relevant outer end plate 12 or 13 (the inside surface of which is formed with shaped channels 23 to accommodate the strips flush with these surfaces) and this end plate and its strips then applied over the terminal members 4–8 or 4′–9′ as the case may be, being secured to the inner plate 1 or 2, and with it to the screen 3, by means of tags such as 24, 24′. These tags pass through holes in the inner end plate 1 or 2 and through holes such as 25, 25′ for tags 24, 24′ in the outer end plates 12 and 13, being bent over at the outer surface of these latter plates so as to extend towards but not touch the terminal members 4–7, 4′–7′ of the contact elements, thereby assisting in directing the magnetic flux to improve sensitivity and screening.

According to the multipling required in respect of connection CH and marking connection M (rectifier RF) in FIG. 1, at the end of the module shown in FIG. 2 the loops 14′–18′ of the strips 14–18 project out through holes 14″–18″ in the end plate 12 with the terminal members 4, 5, 8, 7 and 6 projecting between the sides of the respective loops. Likewise according to the multipling required in respect of connection CV in FIG. 1, at the other end of the module as shown in FIG. 3 the loops 20′–22′ of the strips 20–22 project out through holes 20′–22′ in the end plate 13 which the terminal members 7′, 5′, 6′ projecting between the sides of the respective loops, while the loop 19′ of strip 19 projects out through one of two slots, 10′, through which the terminals 9′ of the operating coil project, the terminal 9′ which projects through a slot 10′ also projects between the sides of loop 19′.

The remaining three terminal members at the latter end (8′, 6′ and the remaining terminal 9′) require to be connected together in accordance with FIG. 1 and this can be done for instance by means of a lightly sprung clip (shown at 90 in FIG. 5) fitted over these terminal members and subsequently soldered to them in the same dip sodering operation by which, as will be later described, multiples are formed from the strips of an assembly of similar modules and the terminal members are finally connected to the loops.

In order to have the outer end plates 12 and 13 also identical with each other to facilitate manufacture, end plate 13 includes unused holes 26, the end plate 12 includes unused slots 27, and the strips 14–22 are so shaped that the channels 23 can have the same shapes in both end plates. It will also be noted that whereas there are nine strips 14–22 they have in fact only three different shapes, strips 14, 18, 19, and 22 being identical with each other (certain of them being reversed end to end) and strips 15, 17, 20 and 21 being also identical with each other.

Instead of forming the strips separately, it is contemplated as an alternative that each set of strips, that is 14–18 and 19–22 could be formed integrally by stamping out and forming the strips of the set from a single sheet, leaving at each end a transverse connecting piece which would be removed after assembly. In order that the developed shapes of the strips (that is, before bending to form the loops and end portions) may be stamped out without mutual interference it may be found that the necessary spacing of the strips is greater than that required for the module, and it is therefore further contemplated that after the stamping and forming operation the required smaller strip spacing may be obtained simply by corrugating or bending concertina-wise between the strips the two transverse connecting pieces.

Figure 4:
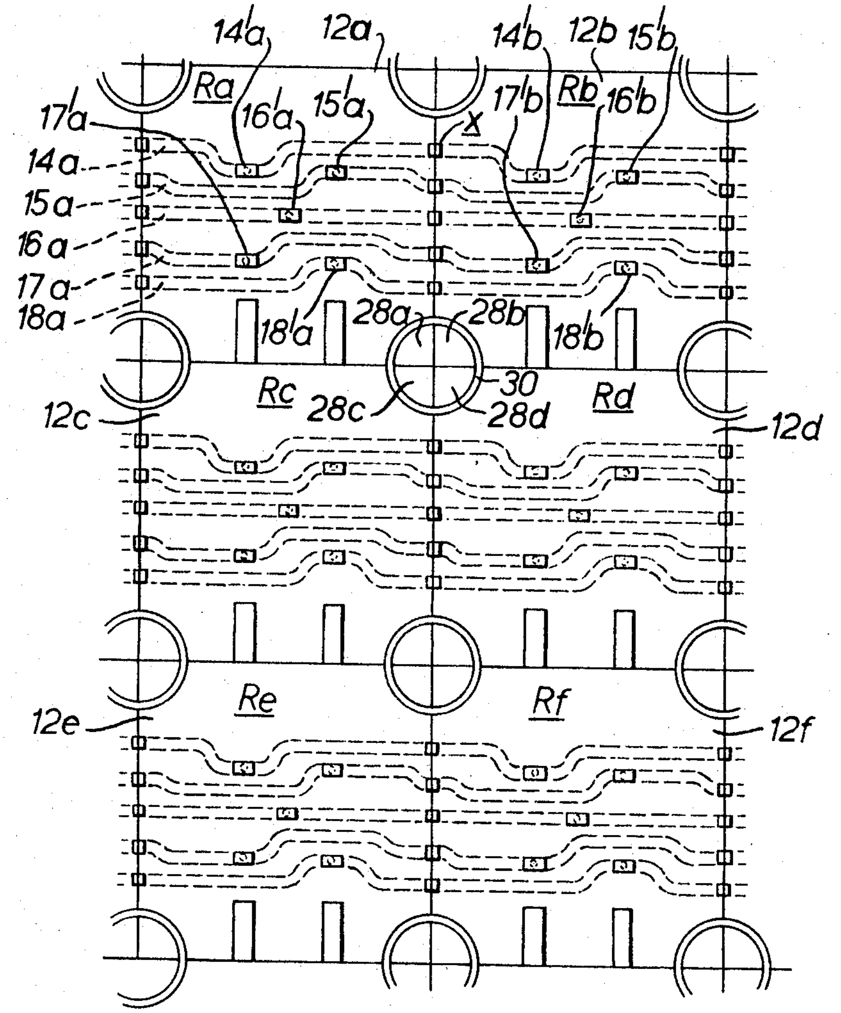
FIGS. 4 and 5 are views showing the front and rear of a switching matrix constituted by an assembly of circuit modules constructed in accordance with the invention, for example as illustrated in FIGS. 2 and 3.
Figure 5:
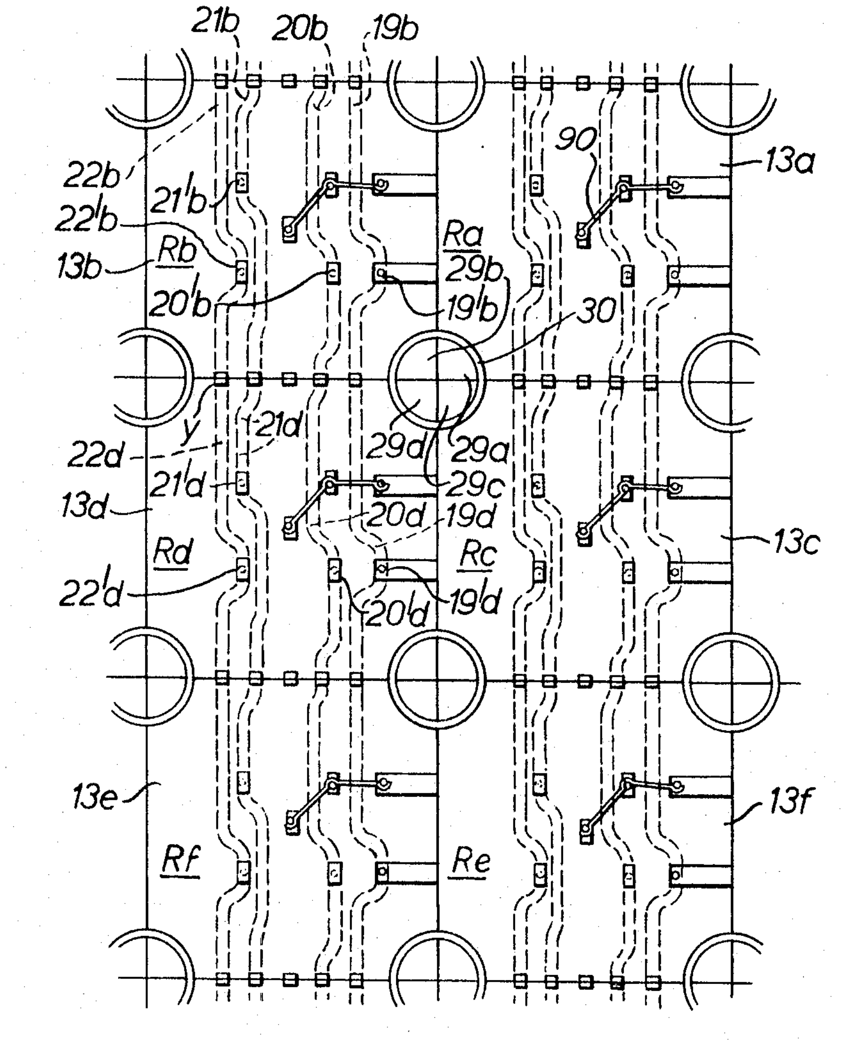

In order to build up a complete co-ordinate switching matrix the requisite number of modules are assembled side-by-side in rows and columns, with adjacent edges of their end plates abutting, as is illustrated in FIG. 4 for one end and FIG. 5 for the other end. In these figures six modules R*a* . . . R*f* of the matrix are shown in end view, with various parts referenced in accordance with FIGS. 2 and 3 but with letter suffices *a* . . . *f* according to the particular module. In each of FIGS. 4 and 5 the conductive strips 14–22 sandwiched between the end plates are shown in dotted lines except where their loops 14′–22′ and their bent-up ends project outwardly of the end plates, namely out of the plane of the drawing in each figure. Because of the shape and disposition of the strips, the modules can be arranged so that their strips at one end are aligned horizontally (FIG. 4) while those at the other end are aligned vertically (FIG. 5). Moreover the projecting end portions of the aligned strips at the abutting edges of the end plates of the modules will lie alongside each other as seen in end view at *x* in FIG. 4 for example and *y* in FIG. 5. The end plates 12 and 13 are shown as having quadrantal projections 28 and 29 on their outer surfaces at each corner, permitting the modules to be assembled together by means for instance of spring clips 30 embracing the four quadrantal projections at each meeting point of the end plates of four modules such as R*a*, R*b*, R*c* and R*d*. This mode of assembly has the advantage that the clips 30 can impart between adjacent modules a spring loading action which pulls them into alignment irrespective of differences of size arising from manufacturing tolerances. This alignment is important since such manufacturing tolerances will be incremental and over a long row of modules may tend to bring about misalignment of and consequent faulty connections between, the strip intended to be aligned between one module and the next. Instead of using clips 30, the corners of the end plates may be chamfered so that at each meeting point a central hole will be left through which a fixing screw can be passed to hold the modules together in conjunction with flanged washers fitted over the quadrantal projections at each end.

With the modules assembled in their matrix and with connecting clips 90 applied as previously described, the projecting parts at the front of the matrix, and then those at the rear, can be dipped into solder, so that the strip loops 14′–22′ and the connecting clips 90 become soldered to the associated projecting terminal members and the abutting projecting end portions of the strips (as at *x* and *y*) also become soldered together thereby completing the required multipling through the aligned strips.

Figures 6, 8:
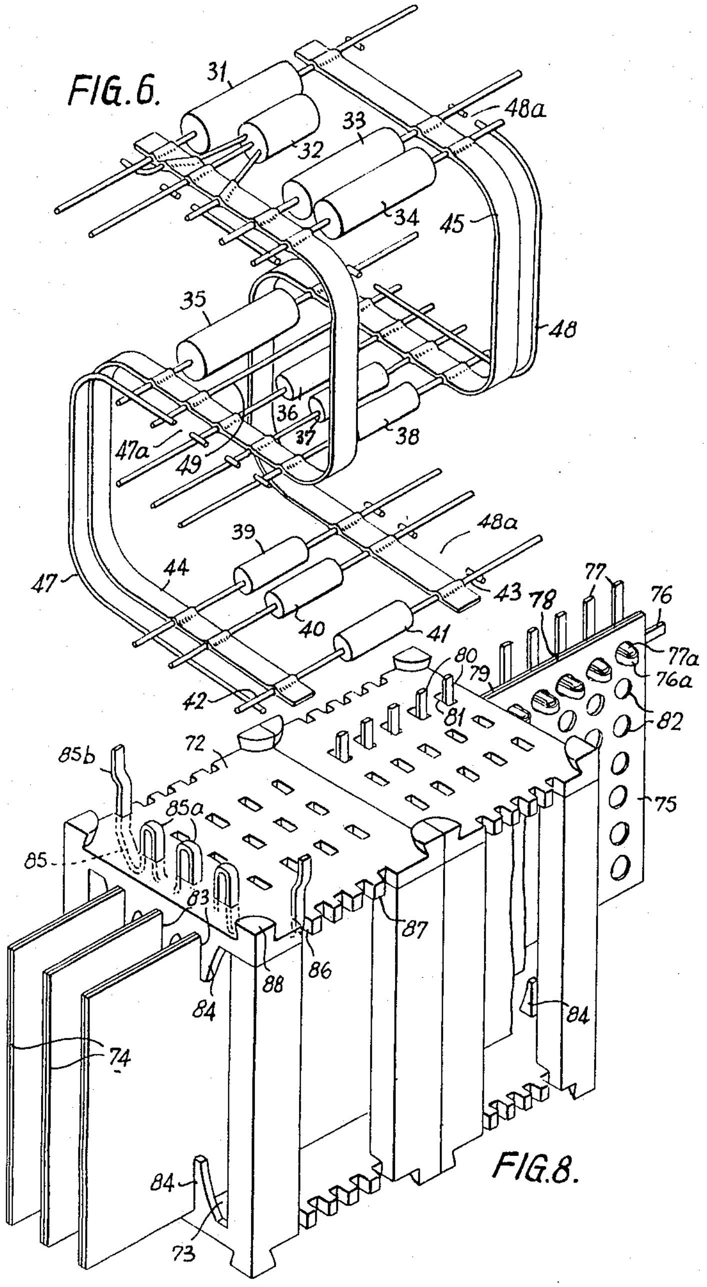
FIG. 6 shows a perspective view of the components and connecting wires of another form of component module in accordance with the invention.
FIG. 8 shows a perspective view of a wiring module in accordance with the invention.

Referring now to FIG. 6 a plurality of electrical components 31, 32, 33 . . . 41 having projecting terminal members such as 42 and 43 are supported between a pair of spaced insulating strips 44 and 45 which locate the terminal members. For this purpose each of the strips 44 and 45 may itself be composed of two strips stuck or welded together with the terminal members located between them at appropriate positions. The components 31 . . . 41 are interconnected by wires such as 47 and 48 which extend across and are connected as by welding, to the terminal members 42, 43 where they protrude beyond the strips 44 and 45. These connecting wires can be applied in continuous lengths laid across and connected to the terminal members alongside each of the strips 44 and 45 and subsequently severed at positions such as 47*a* and 48*a* to provide the desired circuit configurations. This can be done on the flat, by machine if desired, and the assembly then folded into a compact serpentine form as shown. The circuit may also include wires such as 49 which are likewise supported between the two strips 44 and 45 and form connections between the conductors such as 47 and 48.

Figure 7:
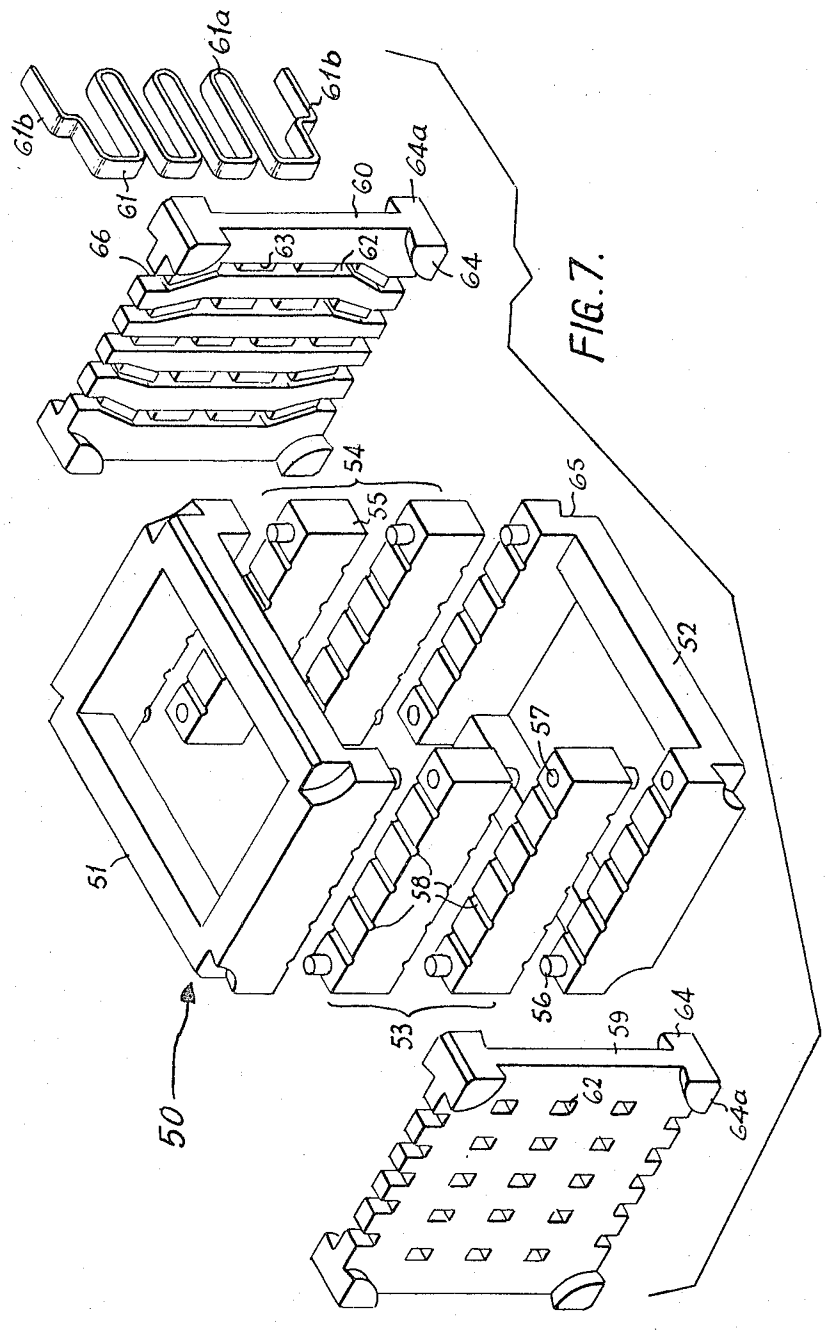
FIG. 7 shows an exploded perspective view of a module housing in which the components of FIG. 6 are accommodated.

Referring now to FIG. 7 a module housing 50 for the serpentine circuit assembly of FIG. 6 comprises top and bottom frame members 51 and 52 and end walls 53 and 54 built up from spacing members 55. The members 51, 52 and 55 which are of an insulating, preferably moulded plastics, material are formed on their facing surfaces with dowel projections 56, cooperating locating holes 57 and pairs of coincident grooves 58. The members 51, 52 and 55 fit together to form a generally rectangular housing 50 in which the circuit assembly of FIG. 6 can be accommodated with the terminal members such as 42 and 43 projecting through apertures formed in the end walls 53, 54 by the pairs of grooves 58. Over the projecting terminal members 42 at one end and 43 at the other end fit respective end plates 59 and 60 between which and respective end walls 53 and 54 are sandwiched preformed conductor strips such as 61 extending across the rows of openings 62 by which the terminal members such as 42 or 43 pass through the relevant end plate 59 or 60. At the position of each opening 62 through which a terminal member passes, the crossing strip 61 is formed with a loop such as 61*a* which will project out through the opening with the two sides of this loop lying along opposite sides of the terminal member. The preformed strips 61 can first be fitted on the relevant end plate 59 or 60 (the inside surface of which is formed with shaped channels 63 to accommodate the strips 61 flush with these surfaces) and this end plate with its strips can then be applied over the terminal members. The strips 61 serve to make connections between suitably disposed non-adjacent components whose projecting terminal wires have been retained and also to extend these terminations to the edge of the module where external electrical connection is normally made. Quadrantal projections 64 on the inner surfaces of the end plates fit within correspondingly shaped recesses 65 on the frame members to locate the end plates in position. External quadrantal projections 64*a* serve the same purpose as the projections 28 and 29 in FIGS. 2 and 3: they are shown as having a tapered undercut to locate an embracing clip more securely The ends of the strips 61, formed as tag portions 61*b* as before, fit within notches 66 in the edges of the end plate. In this case the tag portions 61*b* are shown stepped. This feature, which could also be applied to the tag portions of the end plate conductors in FIGS. 2 and 3, prevents run-back of solder to the roots of the tag portions and also permits selected tag portions to be cut-off so as to discontinue a multipling connection if and where required.

Referring now to FIG. 8, a wiring module, which can be used for affording connection to or between other modules such as those already described, comprises a housing 71 built up from two similar interfitting parts (not shown) each providing one of two end cheeks 72 and 73 and both formed with complementary side portions. The two parts of the housing fit together over opposing edges of one or more prefabricated wiring assemblies such as 74. Each of these assemblies comprises a base 75 of insulating material carrying a coordinate matrix of conductive strips 76 and 77 which extend respectively along and across the base 75. The base 75 itself comprises two laminae 78 and 79 each carrying the strips (76 or 77) pertaining to one ordinate. The strips 76 of one ordinate have terminal portions 80 which project beyond the edge of the lamina 78 through holes such as 81 in the end cheek 72. The laminae 78 and 79 have holes such as 82 at the positions at which the strips 76 cross the strips 77, and each strip 76 has looped portions 76*a* which coincide with and project through the holes 82 in the row along which the strip 76 extends. Each strip 77 has similar looped portions 77*a* which, at selected positions only, project through the holes 82 for electrical connection with the corresponding looped portions 76*a*. The looped portions 76*a* and 77*a* can be connected together by dip soldering. The wiring assemblies 74 are located parallel to each other between the two end cheeks 72 and 73 by means of slots such as 83 formed in inwardly extending edge projections 81. Over the projecting terminal portions 80 fit conductor strips 85 preformed with loops such as 85*a* which project out through the openings 84 with the two sides of the loop lying along opposite sides of the terminal portions 80. Stepped tag portions 85*b* of the strips 85 fit within notches 86 in the edge 87 of the end cheek. Quadrantal projections 88 at the corners permit the wiring modules to be assembled in a matrix with other modules by means of spring clips embracing the four quadrantal projections at each meeting point of four modules as before.

By appropriately selecting the strips 77 for connection to the strips 76 and conductors 85 the strips 76 can provide connection to or between multipling connections formed in alignment with a conductor such as 86 across a matrix assembly including wiring modules according to FIG. 8 in addition to relay or circuit modules according to FIGS. 2 and 3 or FIGS. 6 and 7. Also by omitting strips such as 77 at the position of a conductor such as 85, so that such conductor is not connected to any strip 77, this conductor can serve simply to extend the multiple across the wiring module between other modules on opposite sides of it.

As an alternative to dip soldering the connections may be made by pressure welding by applying suitably apertured scissor plates over the projecting terminal members and displacing these plates sideways relatively one to the other so as by scissor action to apply lateral welding pressure to these members. By the provision of a plurality of suitably positioned apertures in the scissor plates all the projecting members at one end of a module, or of a number of assembled modules, may be thus pressure welded at one time.

It is a feature of the arrangement that a module can be removed with only minor disturbance of the multiples, and without distortion to other modules by unsoldering the strips from those of the neighbouring modules and removal of spring clips, after which the module can be pushed out and replaced. It is a further feature that dummy modules can be equipped initially and subsequently replaced by real modules when required, again with only minor disturbance to the multiple.

What we claim is:

1. An electric circuit module comprising circuit elements having terminal members, a modular support structure containing said elements within it, at least one insulating end piece for said structure, said end piece having an end face and apertures extending through the end piece, through which apertures the said terminal members project, preformed, self-supporting conductors individual to each module, the conductor including a main portion extending across the end piece in a plane substantially parallel to the plane of the said end face from a position of connection with said terminal members to positions adjacent opposite edges of the said end face, said conductor having first portions extending from the said opposite edges of the end face outwardly beyond the end piece in a direction substantially perpendicular to the plane of the said end face and second portions extending from the positions of connection alongside the projecting terminal members outwardly beyond the said end piece in a direction substantially perpendicular to the plane of the said end face.

2. A circuit module as claimed in claim 1 wherein said main portion is located within the thickness of the said end piece.

3. A circuit module as claimed in claim 2 wherein the end piece is of a composite form comprising two parts between which said main portions of the conductors are sandwiched.

4. A circuit module as claimed in claim 3 wherein the conductors are located within groove-like recesses formed in one of said two parts in the surface thereof facing the other part.

5. A circuit module as claimed in claim 1 having end faces with projecting terminal members and conductors at both ends thereof.

6. A circuit module as claimed in claim 5 wherein the main portions of the conductors at one end extend orthogonally with respect to those at the other end.

7. A circuit module as claimed in claim 5 wherein the said circuit elements are located between the said end pieces and said module includes electrical connections between said components additional to any inter-connections which are provided by said conductors.

8. A circuit module as claimed in claim 1 wherein the circuit elements are reed relay contact units located within an operating coil structure between the end pieces.

9. A circuit module as claimed in claim 1 wherein the circuit elements comprise a co-ordinate matrix of electrical connections of which the connections in one ordinate extend through an end piece to provide said terminal members, and selected co-ordinate connections are interconnected where they cross.

10. A circuit module as claimed in claim 9, wherein the co-ordinate matrix of connections is provided on an insulating base, a set of connections for one ordinate of the matrix appearing at one side thereof and a set of connections for the other ordinate appearing at the opposite side with the selected connections from the two sets interconnected through holes in said base.

11. A circuit module as claimed in claim 4 wherein the end piece comprises two laminated parts sandwiching said conductors therebetween, the inner of said two parts having a composite construction comprising a plurality of individual sections having mutually facing surfaces and having grooved recesses within the said mutually facing surfaces of the section, which grooves constitute passages for accommodating the terminal members where they project through the said composite part.

References Cited by the Examiner

UNITED STATES PATENTS

| | | | |
|---|---|---|---|
| 2,019,625 | 11/1935 | O'Brien | 317—101 |
| 2,816,252 | 10/1957 | Sanders | 317—101 |
| 2,816,253 | 10/1957 | Blitz | 317—101 |
| 2,904,768 | 9/1959 | Rasmussen | 317—101 X |
| 3,188,423 | 6/1965 | Glenner et al. | 317—101 X |
| 3,191,100 | 6/1965 | Sorvillo | 317—101 |

FOREIGN PATENTS

| | | |
|---|---|---|
| 901,635 | 7/1962 | Great Britain. |
| 1,126,952 | 4/1962 | Germany. |

ROBERT K. SCHAEFER, *Primary Examiner.*

ROBERT S. MACON, *Examiner.*

W. C. GARVERT, *Assisant Examiner.*